United States Patent [19]

Newport

[11] 4,354,782
[45] Oct. 19, 1982

[54] DRIVE-IN EXPANSION FASTENER

[76] Inventor: Duane B. Newport, 3131 Simon St., Arcola, Ind. 46895

[21] Appl. No.: 178,741

[22] Filed: Aug. 18, 1980

[51] Int. Cl.³ .......................... F16B 13/06; F16B 15/06
[52] U.S. Cl. ........................................ 411/61; 411/74; 411/479
[58] Field of Search .................. 411/61, 60, 62, 74, 411/71, 57, 520, 521, 516, 106, 479, 477

[56] References Cited

U.S. PATENT DOCUMENTS

| | | | |
|---|---|---|---|
| 1,095,366 | 5/1914 | Abbott | 411/60 |
| 2,582,580 | 1/1952 | Bedford, Jr. | 411/520 |
| 2,596,952 | 5/1952 | Crowther | 411/61 |
| 3,895,732 | 7/1975 | Robinson et al. | 411/520 X |
| 4,203,193 | 5/1980 | Arthur | 411/61 X |

FOREIGN PATENT DOCUMENTS

| | | | |
|---|---|---|---|
| 7981 | 6/1902 | Austria | 411/74 |
| 2605732 | 8/1977 | Fed. Rep. of Germany | 411/61 |
| 979470 | 1/1965 | United Kingdom | 411/71 |

Primary Examiner—Ramon S. Britts
Attorney, Agent, or Firm—Gust, Irish, Jeffers & Hoffman

[57] ABSTRACT

An expansion fastener, especially for walls formed of plaster or drywall, in which a metallic sleeve-like member having spreadable sides is provided with a point at one end and an outwardly extending flange at the other. The fastener can be driven into the wall until the flange engages the outer surface of the wall. The pointed end portion of the fastener is circular in cross-section and truncated. Teeth are spaced longitudinally and extend outwardly but within an imaginary cylinder extended from the pointed end portion. A screw threaded into the member spreads the sides thereof and the teeth outwardly forcing them into the side of a hole formed in the wall when the fastener is driven thereinto.

10 Claims, 14 Drawing Figures

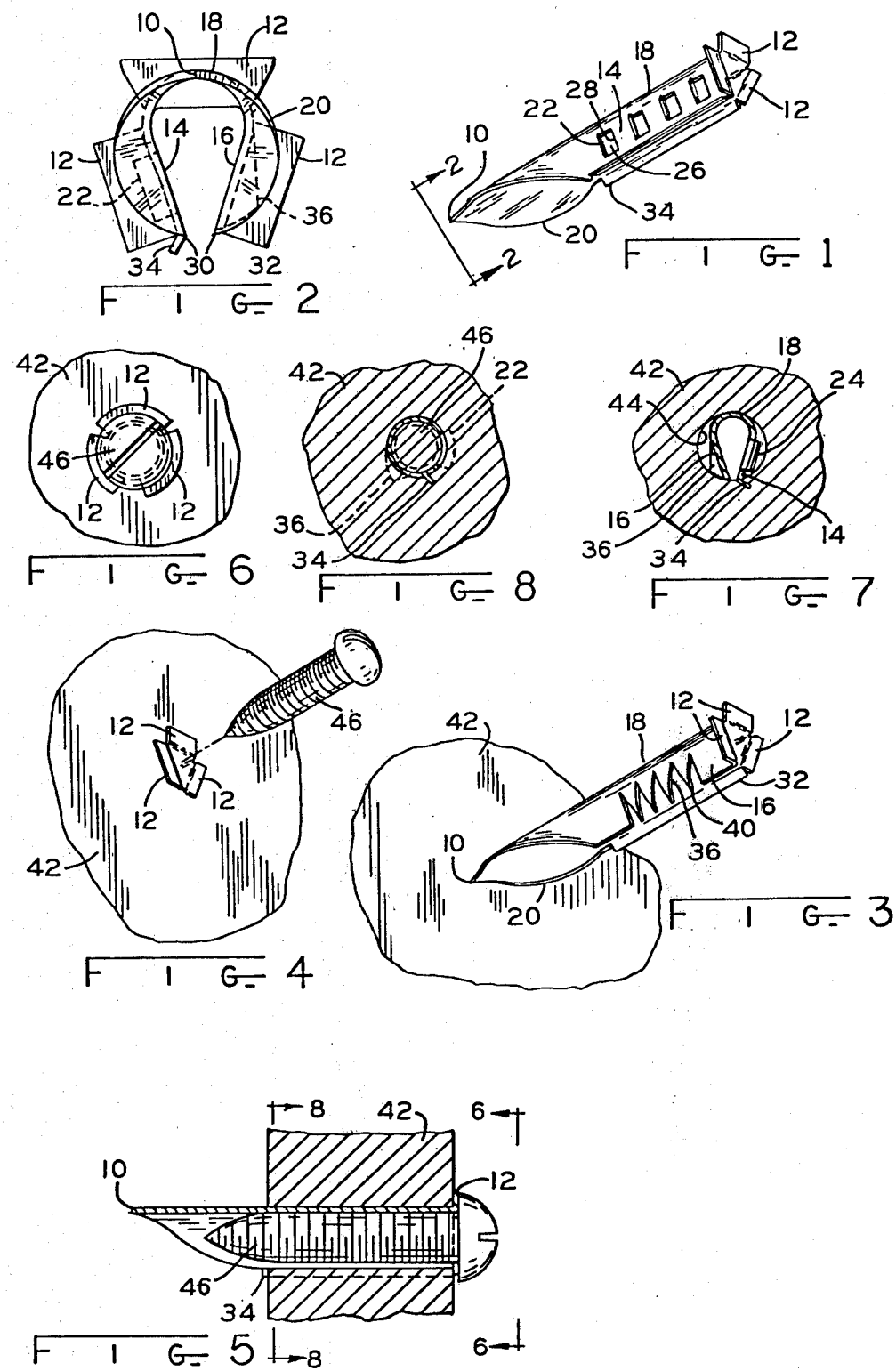

DRIVE-IN EXPANSION FASTENER

BACKGROUND OF THE INVENTION

1. Field of the Invention

The present invention relates to expansion fasteners and more particularly to fasteners which may be easily driven into and removed from conventional plaster or wallboard.

2. Description of the Prior Art

In general, a conventional expansion fastener requires the formation of a hole in the wall for receiving the fastener. The fastener itself is usually provided with means for causing it to expand on the inner side of the wall for securing it in position. Other fastening devices are disclosed in U.S. Pat. Nos. 927,367; 1,161,155; 2,370,327; 2,400,142; 2,404,928; 2,567,884; 2,804,797; 2,805,597; 3,093,178; 3,194,107; 3,269,251; 3,368,446; 3,396,624; 3,417,525; 3,451,455; 3,668,968; 2,696,137; 3,728,761 and 3,877,342.

SUMMARY OF THE INVENTION

An expansion fastner of this invention includes an elongated body of resilient sheet metal pointed on one end and having at least one lateral flange on the other. The body intermediate its ends is provided with a shank portion which is generally triangular in cross-section. The shank portion has two longitudinally extending, generally planar, spaced, juxtaposed sides integrally joined by a longitudinally extending bridging portion. The sides have longitudinal edges opposite from the bridging portion, which are adjacent and spreadable. Longitudinally spaced teeth are provided on said sides, which extend outwardly and are formed of the sheet metal itself. The teeth have exposed edges transversely of the shank portion, and the sides further are provided with thread-engaging edges opposite the teeth, respectively. The pointed end portion of the body is truncated and generally circular in cross-section. The teeth lie radially within an imaginary cylindrical extension of the circular end portion, whereby driving the body into wallboard forms a hole therein conforming to the shape of the pointed end portion which clears the teeth. A longitudinally flared rib may be provided on one exposed edge of a side for engagement with the opening in the wallboard thereby to resist turning movement of the fastener in the formed hole.

A screw of larger diameter than the unspread space between the shank sides when threaded into the fastener causes spreading of the sides and the engagement of the teeth with the hole formed in the wallboard thereby securing the fastener in the hole.

An object of this invention is to provide an expansion type fastener which may be easily assembled to and removed from the wall and which can be secured in the wall against accidental dislodgment.

The above-mentioned and other features and objects of this invention and the manner of attaining them will become more apparent and the invention itself will be best understood by reference to the following description of an embodiment of the invention taken in conjunction with the accompany drawings.

BRIEF DESCRIPTION OF THE DRAWINGS

In the drawings,

FIG. 1 is a perspective view of an embodiment of this invention;

FIG. 2 is an end view taken along section line 2—2 of FIG. 1;

FIG. 3 is a perspective view of a second embodiment of this invention shown in position to be driven into a section of wallboard;

FIG. 4 is a perspective view showing a fastener of this invention installed in a wallboard and a screw about to be fitted thereinto;

FIG. 5 is a longitudinally sectional view of a fastener of this invention assembled into a hole in wallboard with a fastening screw threaded into the fastener itself;

FIG. 6 is a view taken substantially along section line 6—6 of FIG. 5;

FIG. 7 is a cross section taken substantially along section line 7—7 of FIG. 5;

FIG. 8 is another cross section taken substantially along section line 8—8 of FIG. 5;

DESCRIPTION OF THE PREFERRED EMBODIMENT

Figure 9:
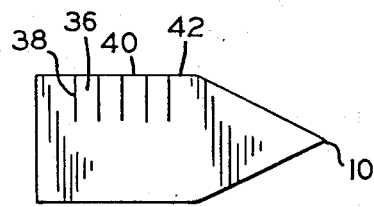
FIG. 9 is a view of a blank of sheet metal from which the fastener of this invention is formed.
Figure 10:
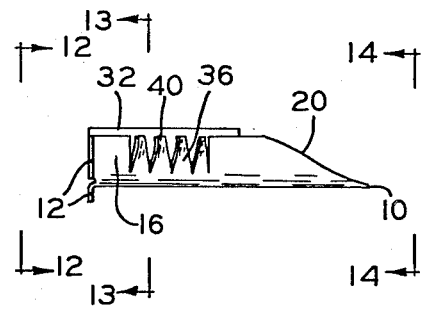
FIG. 10 is a side view of the fastener of FIG. 3.
Figure 11:
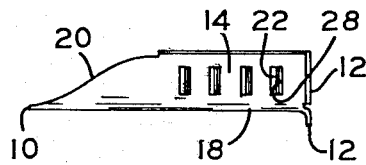
FIG. 11 is a side view of the embodiment of FIG. 1.
Figure 12:
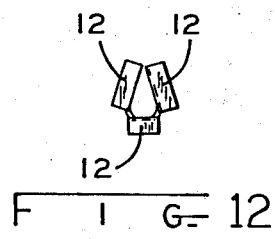
FIG. 12 is an end view taken substantially along section line 12—12 of FIG. 10.
Figure 13:
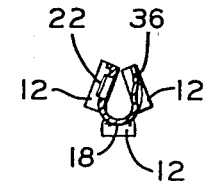
FIG. 13 is a cross section taken substantially along section line 13—13 of FIG. 10.
Figure 14:
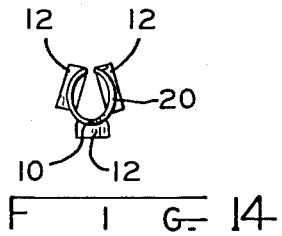
FIG. 14 is a view taken substantially along section line 14—14 of FIG. 10.

Referring to the drawings, the expansion fasteners of FIGS. 1 and 3 are formed of sheet metal stock initially having the shape of the blank of FIG. 9. The fastener on one end is provided with a point 10 and three lateral flanges 12 on the other end. The shank portion intermediate the ends of the body of the fastener is composed of two longitudinally extending, generally planar and spaced apart sides 14 and 16 which are joined together by a longitudinally extending bridging portion 18. The pointed end portion of the fastener body is truncated as indicated by the numeral 20 with the cross section of this portion, or in other words the projection thereof onto a plane substantially normal to the axis of said body, being substantially circular as shown clearly in FIG. 2. As shown the edges of this pointed end portion extend obliquely with respect to the axis of said body.

As shown in FIG. 1, the side 14 is provided with a plurality of longitudinally spaced teeth 22 integrally formed with and struck outwardly from the side 14. These teeth 22 are rectangular with the inner edges being joined to the side 14 along a bend line extending normal to the axis of the fastener and the opposite edge extending parallel and otherwise indicated by the numeral 24. When the teeth 22 are struck from the side 14, corresponding openings 26 are provided therein, the edges 28 of these openings 26 extending normal to the axis of the fastener and otherwise serving as female thread portions for engagement by the threads of an ordinary screw as shown in FIGS. 4 and 5. Longitudinal spacing between and the size of openings 26 and edges 28 correspond to the pitch of screw 46 to be used.

The teeth 22 extend at an obtuse angle from the side 14 with the edges 24 thereof being directed toward the flanges 12. As clearly shown in FIG. 2, the teeth 22 lie radially within an imaginary cylinder extended from the circular projection or cross-section of the truncated end portion 20 of the fastener body.

The two sides 14 and 16 and the bridging portion 18 in cross-section conjointly form in cross-section a shape that is generally triangular. The edges 30 and 32 of the two sides 14 and 16, respectively, thus are adjacent to each other. One of the edges 30 and 32 has an outwardly flared, longitudinally extending rib 34 bent therefrom, although both edges 30 and 32 may be provided with such a rib as shown in FIG. 1.

Referring to FIG. 3, like numerals indicate like parts. The side indicated by the numeral 16 in this embodiment has differently shaped teeth formed therein, these being indicated by the numeral 36. These teeth 36 are formed by transversely slitting the blank of FIG. 9 along the lines indicated by the numeral 38 and then twisting the teeth such that the outer edges 40 extend at right angles to the edge 42 of the blank. Spacing between slits correspond to the thread pitch of screw 46. This positions portions of the longitudinal edges of the teeth 36 at essentially right angles to the longitudinal axis of the fastener body such that the inner edges serve as female threads and the outer edges as teeth for retaining the fastener in a hole formed in wallboard.

While the teeth 22 and 36 constitute the primary differences in the two embodiments of FIGS. 1 and 3, still another embodiment may be formed by providing these teeth in the same fastener but in the opposite sides 14 and 16. Such an arrangement is depicted, for example, in FIGS. 2 and 7.

In use, a hammer is used for driving the fastener, point end first, into and through a section of wallboard formed of plaster or the like. Such a section of wallboard is indicated by the numeral 42 in FIG. 3. As the fastener is being driven through the wallboard 42, the pointed end 10 in combination with the opposite longitudinal edges of the truncated end portion 20 cuts a circular hole 44. Within the hole 44, the shank of the fastener has the shape shown in FIG. 7. A screw 46 is used with the fastener and is selected to have a diameter larger than the spacing between the shank sides 14 and 16. This screw 46 is entered (FIG. 4) and then threaded into the fastener by reason of the engagement of the screw threads with the edges 28 of the openings 26 (FIG. 1) and the inner edges of the teeth 36 (FIG. 3). As the screw 46 penetrates the fastener, it spreads the sides 14 and 16 apart causing engagement of the teeth 22 and 36 with the wall of the opening 44. The teeth being thus indented into the wall prevent withdrawal of the fastener from the hole 44.

Should it be desired to remove the fastener from its hole, it is only necessary to unthread the screw 46 from the fastener thereby permitting the shank sides 14 and 16 to spring inwardly to the position shown in FIG. 7 at which the teeth 22 and 36 retract from the wall of the hole 44. The fastener may then be merely pulled from the hole 44.

As shown in FIG. 2, the flared rib 34 extends radially outwardly beyond the imaginary circle defined by the truncated end portion 20. Thus, as the fastener is driven into the wallboard, the rib 34 cuts a groove therein and thus becomes keyed within the hole 44. This rib 34 thus prevents rotation of the fastener during the threading of the screw 46 thereinto.

The teeth on the shank and the female thread edges are so related dimensionally to the screw 46 that the screw threads engage the thread edges and the inner surfaces of the shank sides to spread the latter sufficiently to engage the teeth with the wall of hole 44.

While there have been described above the principles of this invention in connection with specific apparatus, it is to be clearly understood that this description is made only by way of example and not as a limitation to the scope of the invention.

What is claimed is:

1. An expansion fastener comprising an elongated body of resilient sheet metal pointed on one end and having at least one lateral flange on the other end, said body intermediate the ends having a shank portion which is generally triangular in cross section, said shank portion having two longitudinally extending generally planar spaced juxtaposed sides integrally joined by a longitudinally extending bridging portion, said sides having longitudinal edges opposite from said bridging portion which are adjacent and spreadable, at least one tooth on one of said sides extending outwardly therefrom and formed of said sheet metal, said one side having a thread-engaging edge opposite said teeth which extends transversely of said shank portion, the pointed end portion of said body being defined by two other edges which converge at said pointed end and at the other ends join said longitudinal edges, respectively, said other two edges extending obliquely with respect to the axis of said body, the projection of said two other edges onto a plane which is substantially normal to the axis of said body being substantially circular, said tooth lying radially within an imaginary cylindrical extension of said pointed end portion, whereby driving said body into wallboard forms a hole therein conforming to the shape of said pointed end portion which clears said tooth.

2. The fastener of claim 1 wherein one of the edges of one side has a longitudinally extending rib flared oppositely away from the edge of the other side.

3. The fastener of claim 1 including a plurality of teeth like said tooth on said shank side which are longitudinally spaced.

4. The fastener of claim 3 wherein one of the edges of one side has a longitudinally extending rib flared oppositely away from the edge of the other side.

5. The fastener of claim 4 wherein said teeth are orthogonal sections each being bent from said shank side along a line transversely of said body.

6. The fastener of claim 4 wherein said teeth are rectangular sections each having opposite edges extending transversely of said body and joined at the end to said shank side adjacent said bridging portion, said teeth being at an angle to the plane of said shank side.

7. The fastener of claim 3 having three of said flanges on the other end of said body, each flange being bent from the end of each of said shank sides and bridging portion.

8. The fastener of claims 5 or 6 including a plurality of thread-engaging edges in the respective shank side opposite said teeth, respectively, said thread-engaging edges extending transversely of said body.

9. The fastener of claim 8 including in combination a threaded fastener threadedly received by said body between said sides and bridging portion, said fastener being larger in diameter than the spacing between said sides whereby the latter are spread apart by said fastener.

10. The fastener of claim 9 wherein said thread-engaging edges are spaced correspondingly to the thread pitch of said fastener with the threads of the latter engaged with said thread-engaging edges.

* * * * *